(12) United States Patent
Itoh et al.

(10) Patent No.: US 8,191,702 B2
(45) Date of Patent: Jun. 5, 2012

(54) ARTICLE LIFTING DEVICE

(75) Inventors: Kazuo Itoh, Hyogo (JP); Tomonobu Hasegawa, Hyogo (JP)

(73) Assignee: Itoh Denki Co., Ltd. (JP)

( * ) Notice: Subject to any disclaimer, the term of this patent is extended or adjusted under 35 U.S.C. 154(b) by 360 days.

(21) Appl. No.: 12/460,402

(22) Filed: Jul. 17, 2009

(65) Prior Publication Data

US 2010/0051420 A1 Mar. 4, 2010

(30) Foreign Application Priority Data

Aug. 26, 2008 (JP) ................................. 2008-216897

(51) Int. Cl.
*B65G 17/12* (2006.01)
(52) U.S. Cl. ..................................... 198/801; 198/468.8
(58) Field of Classification Search ............... 198/474.1, 198/475.1, 468.8, 801
See application file for complete search history.

(56) References Cited

U.S. PATENT DOCUMENTS

| | | | | |
|---|---|---|---|---|
| 3,168,951 A | * | 2/1965 | Gold et al. ....................... | 312/97 |
| 4,273,234 A | * | 6/1981 | Bourgeois .................. | 198/347.3 |
| 4,718,536 A | * | 1/1988 | Toby ........................... | 198/469.1 |
| 5,141,128 A | * | 8/1992 | Pippin .............................. | 221/84 |
| 5,788,057 A | * | 8/1998 | Walser et al. ................. | 198/797 |
| 5,934,670 A | * | 8/1999 | Todoki .......................... | 271/294 |
| 6,070,712 A | * | 6/2000 | Baez ............................ | 198/802 |
| 6,945,380 B2 | * | 9/2005 | Sauer .......................... | 198/339.1 |
| 7,237,654 B2 | * | 7/2007 | Sakura et al. ................. | 187/270 |
| 7,637,712 B2 | * | 12/2009 | Varney et al. ............... | 414/795.2 |
| 7,748,514 B2 | * | 7/2010 | Shimizu et al. ............ | 198/346.1 |

FOREIGN PATENT DOCUMENTS

| | | |
|---|---|---|
| JP | 54-49386 | 4/1979 |
| JP | 55-101531 | 8/1980 |
| JP | 07-137837 | 6/1995 |
| JP | 2001-187632 | 7/2001 |
| JP | 2005-022861 | 1/2005 |
| JP | 2006-016203 | 1/2006 |

* cited by examiner

*Primary Examiner* — Douglas Hess
(74) *Attorney, Agent, or Firm* — Wood, Phillips, Katz, Clark & Mortimer

(57) ABSTRACT

An article lifting device 1 for lifting up and down articles includes a plurality of basic unit conveyors 11, the conveyors 11 each having an upper and a lower rotary bodies 13, and an elongated carrier 12 looped around the upper and lower rotary bodies 13. The carrier 12 is provided with a supporting body 14 for supporting an article. The basic unit conveyors 11 are arranged vertically and horizontally in a plane, so that the carriers 12 overlap in a vertical direction.

13 Claims, 16 Drawing Sheets

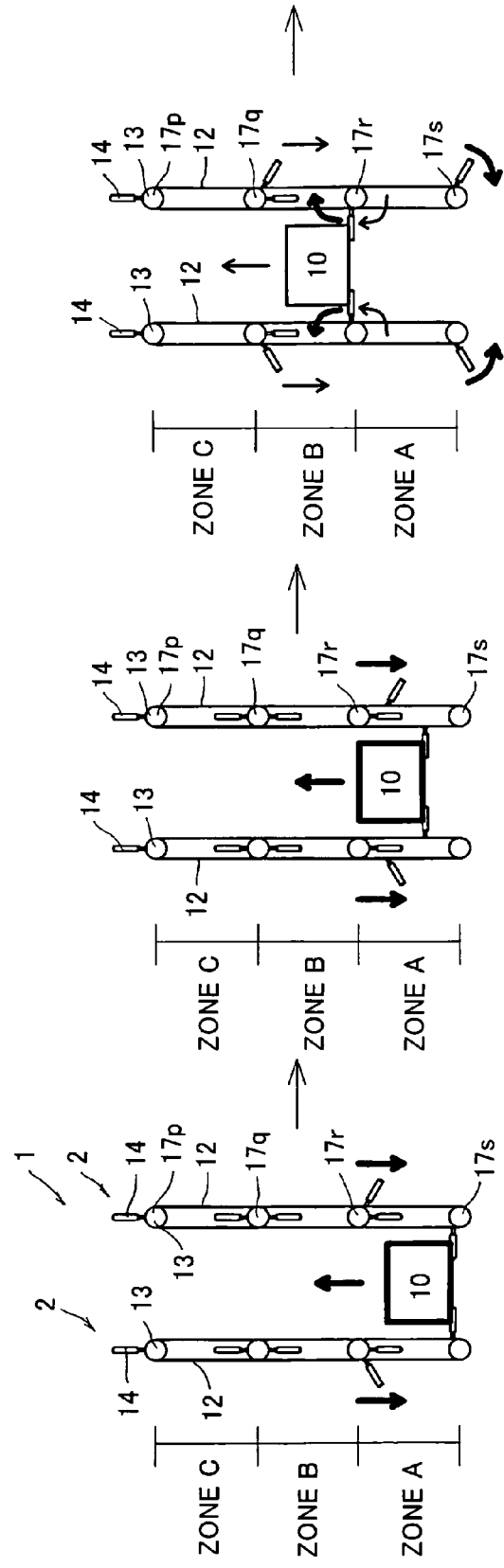

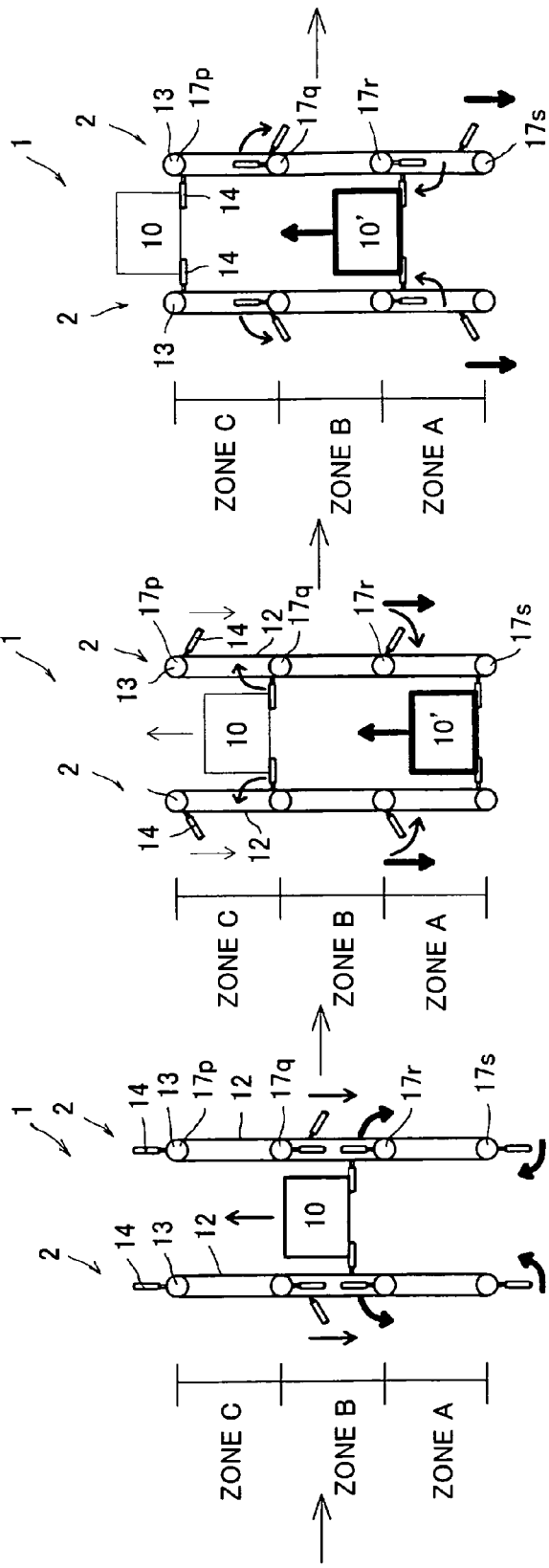

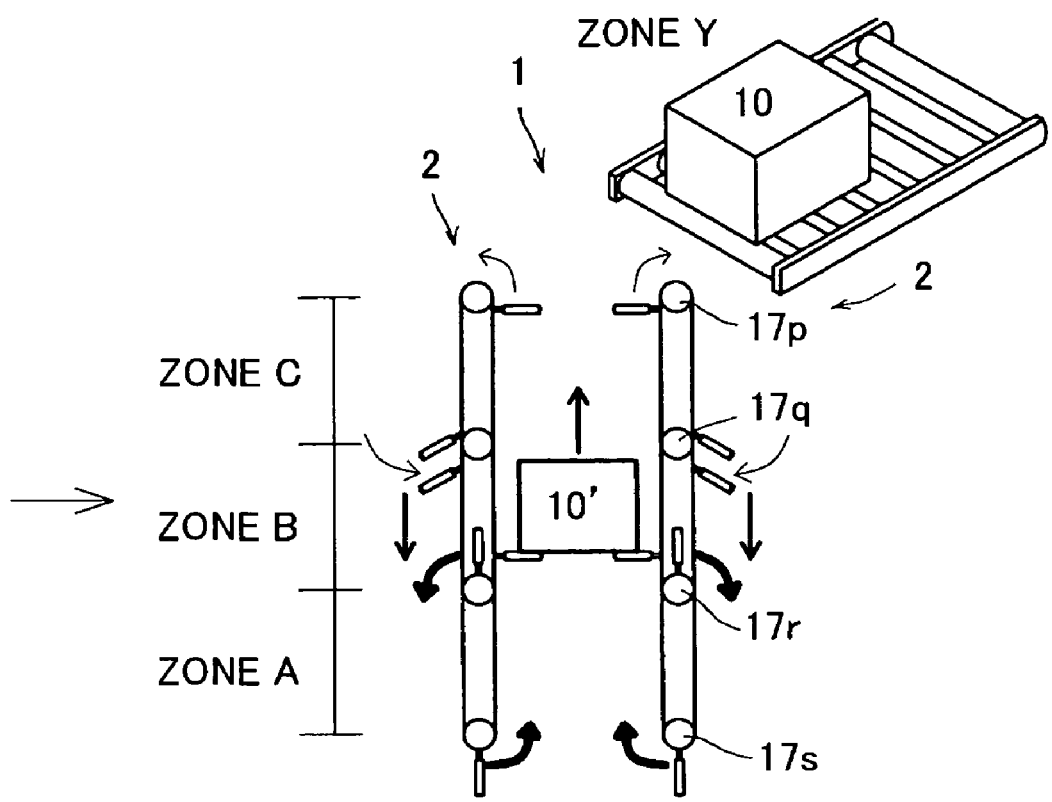

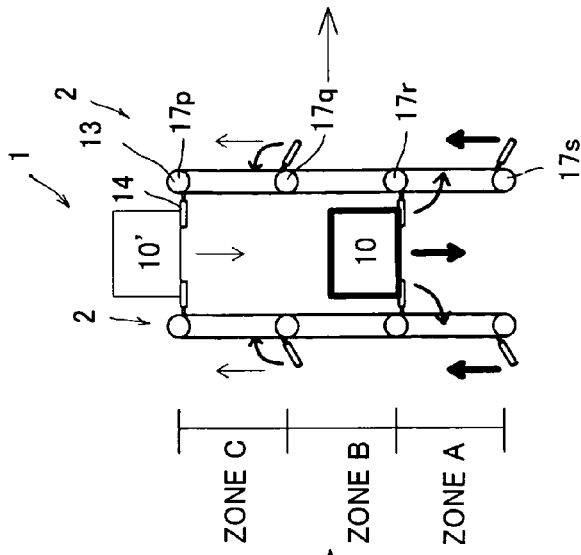
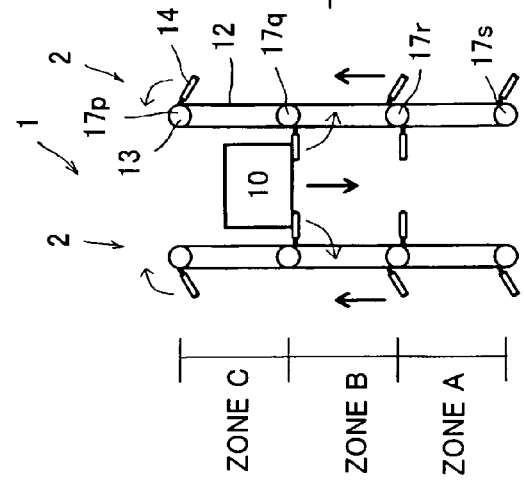
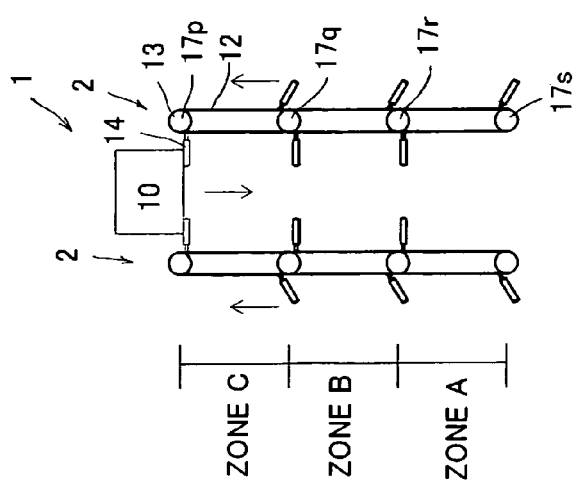

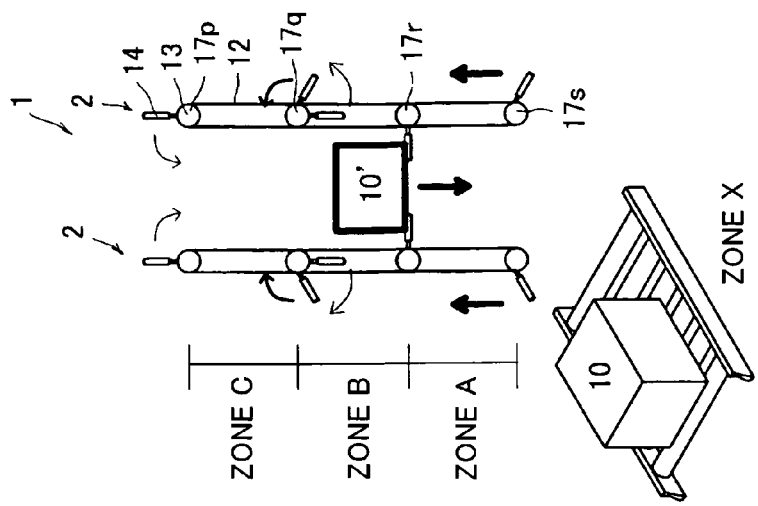
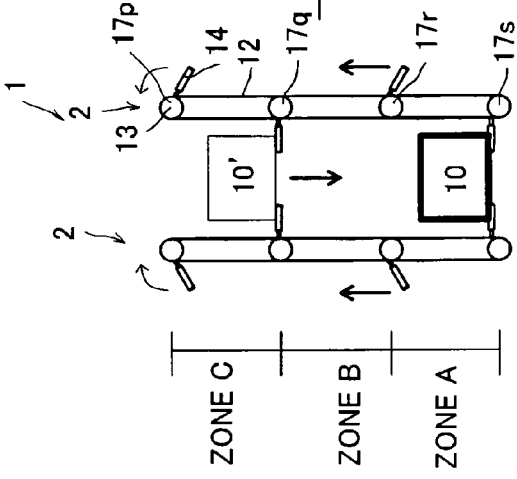
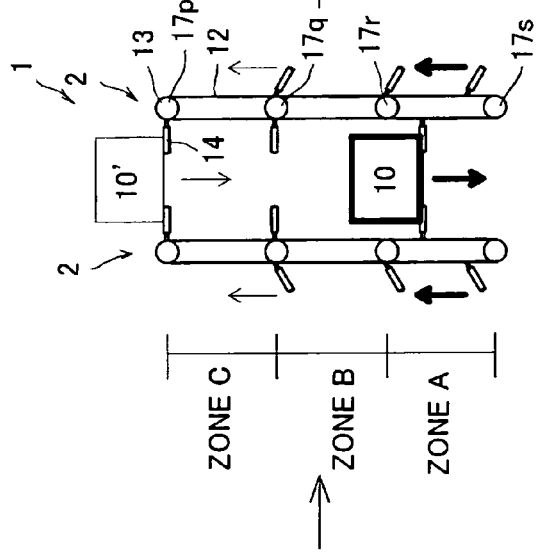

ARTICLE LIFTING DEVICE

BACKGROUND OF THE INVENTION

1. Field of the Invention

The present invention relates to an article lifting device capable of conveying articles in a vertical direction.

2. Description of the Related Art

Conventionally, in conveying articles by using a conveyor, article lifting devices are used for conveying articles in a vertical direction such as from the ground to an upper floor or from an upper floor to a lower floor. The conventional lifting device includes a device conveying articles by a vertically movable table to which belts or chains are connected via a pulley, like an elevator.

Patent document 1, for example, discloses an invention in which an article is conveyed up and down with being held between vertical conveyors facing each other and extending heightwise.

Further, patent document 2 discloses an invention in which an article is conveyed by heightwise motion of a frame-type carriage connected to a wire rope which is looped around a pulley provided with a driving motor.

Patent Document 1: JP 2001-187632A
Patent Document 2: JP 2006-16203A

DISCLOSURE OF THE INVENTION

Problem to be Solved by the Invention

However, the article lifting devices described in the patent documents 1 and 2 has such a problem that a number of articles cannot be conveyed to various heights in response to conditions in a short period of time.

The invention described in the patent document 1 is designed to lift up an article with holding the article between two conveyors facing each other and vertically arranged.

By a configuration disclosed in the patent document 1, articles are conveyed only one by one. Specifically, according to the invention in the patent document 1, while one article is held and lifted up, another article cannot be set between the conveyors, resulting in conveyance of only one article at one time.

A configuration disclosed in the patent document 2 is directed to a conveying device of an elevator type, which lifts up and down articles by lifting up and down a carriage.

Specifically, according to the invention in the patent document 2, an article is conveyed by a carriage, resulting in conveyance of only one article at one time.

According to the inventions described in the patent document 1 and 2, it is difficult to convey a plurality of articles, especially those having different sizes and/or shapes in a short period of time. Further, according to the known art, it is also difficult to efficiently convey a plurality of articles, especially those having different sizes and/or shapes to various heights.

An object of the present invention made in view of the problems and drawbacks in the art described above is therefore to provide an article lifting device capable of conveying a plurality of articles, especially those having different sizes and/or shapes in a short period of time and further efficiently conveying articles to a plurality of various heights or levels.

Means to Solve the Problem

An aspect of the present invention to solve the above-mentioned problems is an article lifting device for lifting up and down articles, the device including a plurality of basic unit conveyors, the conveyors each having an upper rotary body, a lower rotary body arranged below the upper rotary body, and an elongated carrier looped around the upper and lower rotary bodies, the rotary bodies being for driving the carrier, the carrier being provided with at least one supporting body for supporting an article, wherein the basic unit conveyors are arranged vertically and horizontally in a plane, so that vertically-adjacent basic unit conveyors overlap in a vertical direction.

The lifting device in the present aspect mainly consists of a plurality of basic unit conveyors arranged vertically and horizontally in a plane, whereby an article is lifted up and down. Each of the conveyors is constituted by an upper rotary body, a lower rotary body arranged below the upper rotary body, and an elongated carrier such as a chain looped around the upper and lower rotary bodies. The carrier is provided with a supporting body, on which an article is placed and conveyed. That ensures conveyance of articles regardless of their sizes or shapes. Further, vertically-adjacent carriers overlap in a vertical direction, thereby conveying an article in sequence. Consequently, the present aspect enables to convey a number of articles to a required level in a short period of time regardless of their sizes or shapes. That achieves an efficient conveyance.

Further, the device in the present aspect can combine a desired number of basic unit conveyors in a vertical and a horizontal directions, so that a height and a width of the device can be changed depending on the situation.

Preferably, the device of the present aspect further includes a plurality of substantially horizontally-placed shafts arranged in a vertical direction, wherein the basic unit conveyors are arranged vertically and horizontally in a plurality of columns and rows, wherein the upper rotary bodies of the conveyors belonging to one row and the lower rotary bodies of the conveyors belonging to a next superior row are penetrated by one shaft among the shafts, the rotary bodies belonging to one row among the rotary bodies penetrated by one shaft being rotatable integrally with the shaft, and the rotary bodies belonging to the other row being rotatable freely from the shaft.

In such an article lifting device, a plurality of substantially horizontally-placed shafts are arranged in a vertically direction, more preferably parallel to each other, and the basic unit conveyors are arranged vertically and horizontally in a plurality of columns and rows. Further, in such the device, the upper rotary bodies of the conveyors belonging to one row (a group of the basic unit conveyors aligned at the same level) and the lower rotary bodies of the conveyors belonging to a next superior row are penetrated by one shaft. Therefore, the conveyors belonging to each one row, or the conveyors aligned in a horizontal row, are synchronously driven.

On the other hand, the rotary bodies belonging to one row rotate integrally with the shaft, whereas the rotary bodies belonging to the other row rotate freely from the shaft. That allows independent driving of the basic unit conveyors with respect to each row.

Specifically, since the rotary bodies of the conveyors belonging to one row rotate integrally with the shaft, rotation of the shaft drives the basic unit conveyors belonging to those. Meanwhile, since the other rotary bodies of the same conveyors rotate freely from the shaft penetrating therethrough, the other rotary bodies rotate in association with the first-mentioned rotary bodies regardless of rotation of the shaft.

Thus, since the carriers of the basic unit conveyors receive transmission of power only from one shaft, the carriers of the conveyors aligned in a horizontal row are all synchronously driven and the carriers of the conveyors vertically aligned are driven independently of other rows.

While the conveyors in a specific row (zone A, for example) convey an article, the conveyors in another row (zone B, for example) are independently driven, and hence the conveyors belonging to a plurality of rows convey articles without interruptions. That means it is possible to change control of a direction or a speed of rotation of vertically-adjacent conveyors. In other words, it is possible to convey articles by different control in upper and lower rows, first, second and third rows, and so on.

Further, such the device is constituted by the basic unit conveyors arranged vertically and horizontally in a plurality of rows and columns. Adjustment of rows in a horizontal direction enables to convey extended articles, and adjustment of columns in a vertical direction enables to convey articles to a required level. In short, the device can be changed in size depending on kinds of articles.

Consequently, multiple controls enable to efficiently convey a plurality of articles, especially those having different sizes and/or shapes to a plurality of various heights or levels.

It is preferable that the shafts include at least one shaft connected to a driving source.

The driving source is not particularly limited and may be something such as an electric motor or an internal combustion engine, but an electric motor is preferable because of quick driving and stopping.

It is preferable that the driving source is connected to a plurality of shafts so as to selectively drive and stop each of the shafts.

By such a configuration, only necessary conveyors are driven, so that energetic consumption is reduced.

Preferably, the basic unit conveyors arranged vertically and horizontally in a plane constitute a unit, at least one pair of the units being arranged opposite each other.

In such a lifting device, a plurality of conveyors are arranged opposite each other, thereby conveying articles in a balanced manner.

It is preferable that the supporting body is pivotable between a conveying position for supporting an article and a waiting position for preventing the supporting body from protruding out of the device.

In such a lifting device, since the supporting body has a free pivotal position relative to a driving direction of the carrier, the supporting body is pivoted so as to minimize its running track when the supporting body is not supposed to support an article. In short, the supporting body follows a compact track, thus being prevented from becoming an obstacle to other facilities.

It is preferable that the carrier is looped annularly around the upper and lower rotary bodies and driven round the rotary bodies in a circle on a substantially straight front track and a substantially straight rear track, the front track being situated nearer an article than the rear track, and that the device is designed to change an orientation of the supporting body to take the conveying position when the body enters the front track and to change that of the supporting body to take the waiting position when the body enters the rear track.

In such a lifting device, an orientation or position of a mounting part of the supporting body is easily changed. Thus, the supporting body protrudes when driving along a straight front track via which an article is conveyed, so as to stably convey the article up and down in a vertical direction. The supporting body is prevented from protruding out of the straight front track when driving along a straight rear track where an article is not supposed to be conveyed, so as to be prevented from becoming an obstacle around. In short, compact driving track of the supporting body enables efficient use of space.

The conveyors each preferably include a first guide and a second guide, the first guide changing an orientation of the supporting body to take the conveying position when the body enters the front track, and the second guide changing an orientation of the supporting body to take the waiting position when the body enters the rear track.

In such a device, simple configuration enables switching between the conveying position and the waiting position.

It is preferable that the supporting body is of a substantially L shape and has a horizontal part extending in a substantially horizontal direction and a vertical part extending in a substantially vertical direction, the supporting body being supported by the carrier pivotally around an axis of the vertical part, so that pivoting of the supporting body alternates the conveying position and the waiting position.

Also in such a device, simple configuration enables switching between the conveying position and the waiting position.

It is preferable that the supporting body has a hollow cylindrical rotatable member and a supporting shaft inserted in the rotatable member, the rotatable member being designed to support an article by being brought into contact with the article, and the supporting shaft being designed to support the member rotatably around the supporting shaft.

In such a lifting device, since the rotatable member rotates around the supporting shaft, an article is easily conveyed to a conveying direction. Rotation of the rotatable member allows an article to be smoothly introduced into and carried out of the lifting device. Consequently, the device prevents such a problem in which adjacent articles in a conveying direction bump against each other resulting from being got hung up on a conveyor when the articles are introduced into and carried out of the device.

It is preferable that the supporting shaft extends in a substantially horizontal direction.

Such a configuration allows stable support and conveyance of articles.

Preferably, the basic unit conveyors each include a pair of plate-like outer members arranged to face to each other, two rotary bodies arranged as sandwiched between the outer members, an elongated carrier looped annularly around the rotary bodies, and a plurality of supporting bodies secured to the carrier, the carrier being driven round the rotary bodies in a circle on a substantially straight front track and a substantially straight rear track, and the outer members having a first guide for changing an orientation of each supporting body to take a conveying position for supporting an article when the supporting body enters the front track and a second guide for changing an orientation of each supporting body to take a waiting position for preventing the supporting body from protruding out of the device when the supporting body enters the rear track.

That embodies the article lifting device of the present aspect by a simple configuration.

Advantageous Effect of the Invention

The article lifting device of the present invention conveys articles in sequence, thereby conveying a plurality of articles, especially those having different sizes and/or shapes in a short period of time. Further, the present invention can provide the article lifting device capable of efficiently conveying articles to a plurality of various heights or levels.

BRIEF DESCRIPTION OF THE DRAWINGS

FIGS. 5A to 5C are explanatory diagrams showing operations of the article lifting device in this embodiment, showing consecutive states in which an article is introduced into the device and conveyed upward in a vertical direction;

FIGS. 6D to 6F are other explanatory diagrams showing operations of the article lifting device in this embodiment, showing consecutive states in which articles are conveyed upward in a vertical direction;

FIG. 7G is a still another explanatory diagram showing operations of the article lifting device in this embodiment, showing a state in which articles are conveyed upward in a vertical direction and transferred out of the device;

FIGS. 8A to 8C are further explanatory diagrams showing operations of the article lifting device in this embodiment, showing consecutive states in which an article is introduced into the device and conveyed downward in a vertical direction;

FIGS. 9D to 9F are still further explanatory diagrams showing operations of the article lifting device in this embodiment, showing consecutive states in which articles are conveyed downward in a vertical direction and transferred out of the device;

Herein, FIG. 4 and FIG. 12 relate to the embodiments in which only orientations of vertical parts (described below) of the respective supporting bodies 14 are different, and either embodiment can be put into practice.

DESCRIPTION OF THE PREFERRED EMBODIMENTS

Figure 1:
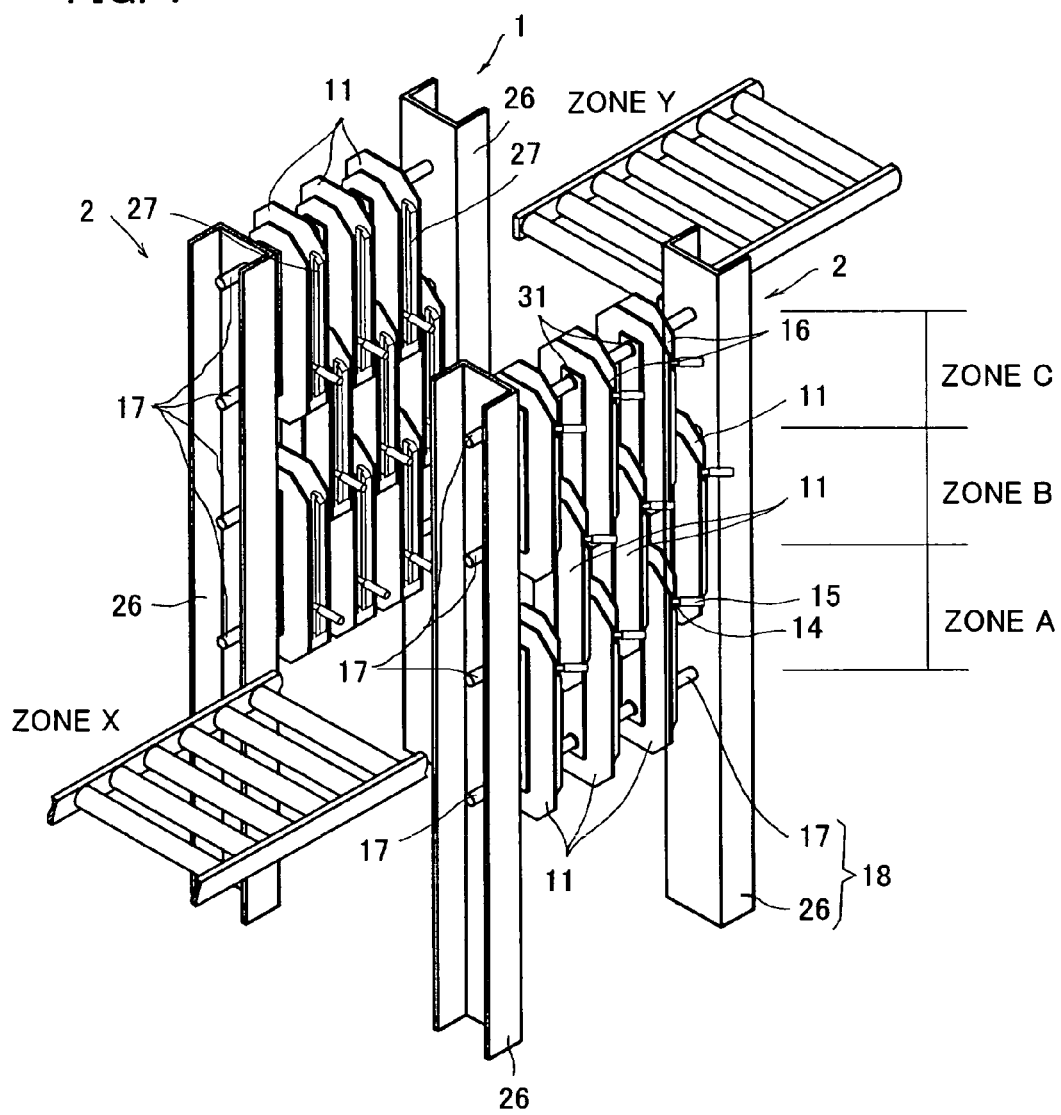
FIG. 1 is a perspective view of an article lifting device relating to an embodiment of the present invention.

Now, a preferred embodiment of the present invention will be described below in detail, making reference to the accompanying drawings. Referring to FIG. 1, an article lifting device 1 (hereinafter also referred to as a lifting device 1) connects horizontal conveyor lines of different heights for efficient conveyance of articles.

Figure 3:
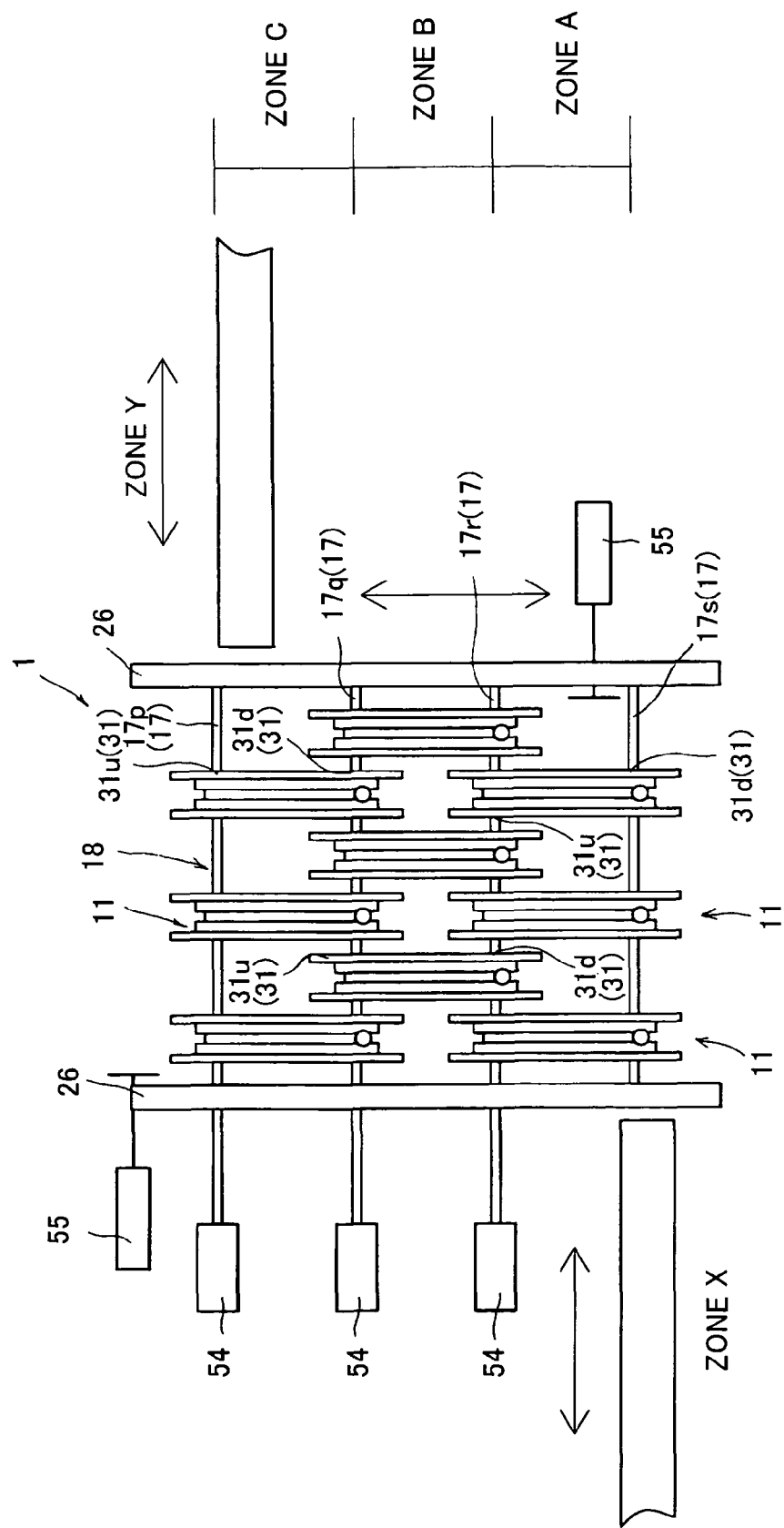
FIG. 3 is a schematic diagram showing the article lifting device relating to this embodiment.

The lifting device 1 in this embodiment, as shown in FIG. 3, is provided with a vertical conveyor line divided into three control zones, i.e., zone A, zone B, and zone C, from a lower side, each of the zones having a load presence sensor (not shown). Each of the zones of the lifting device 1 is driven and stopped independently of any other zones. Independent control of each zone allows smooth conveyance of articles.

The load presence sensor (not shown) herein may include a photoelectric sensor. There is provided a light emitting device (not shown) such as a light-emitting diode or an infrared diode at a side opposite to the photoelectric sensor. The photoelectric sensor is turned on and off by blocking of light from the light emitting device when an article is conveyed, thereby detecting conveyance of the article to a predetermined location.

Specifically, output of the load presence sensor is used as a load presence signal showing existence or nonexistence of an article at each control zone. The sensor outputs an on (H level) signal on detection of existence of an article and an off (L level) signal in the case of nonexistence of an article.

Next, a configuration of the lifting device 1 will be described in detail below.

Figure 2:
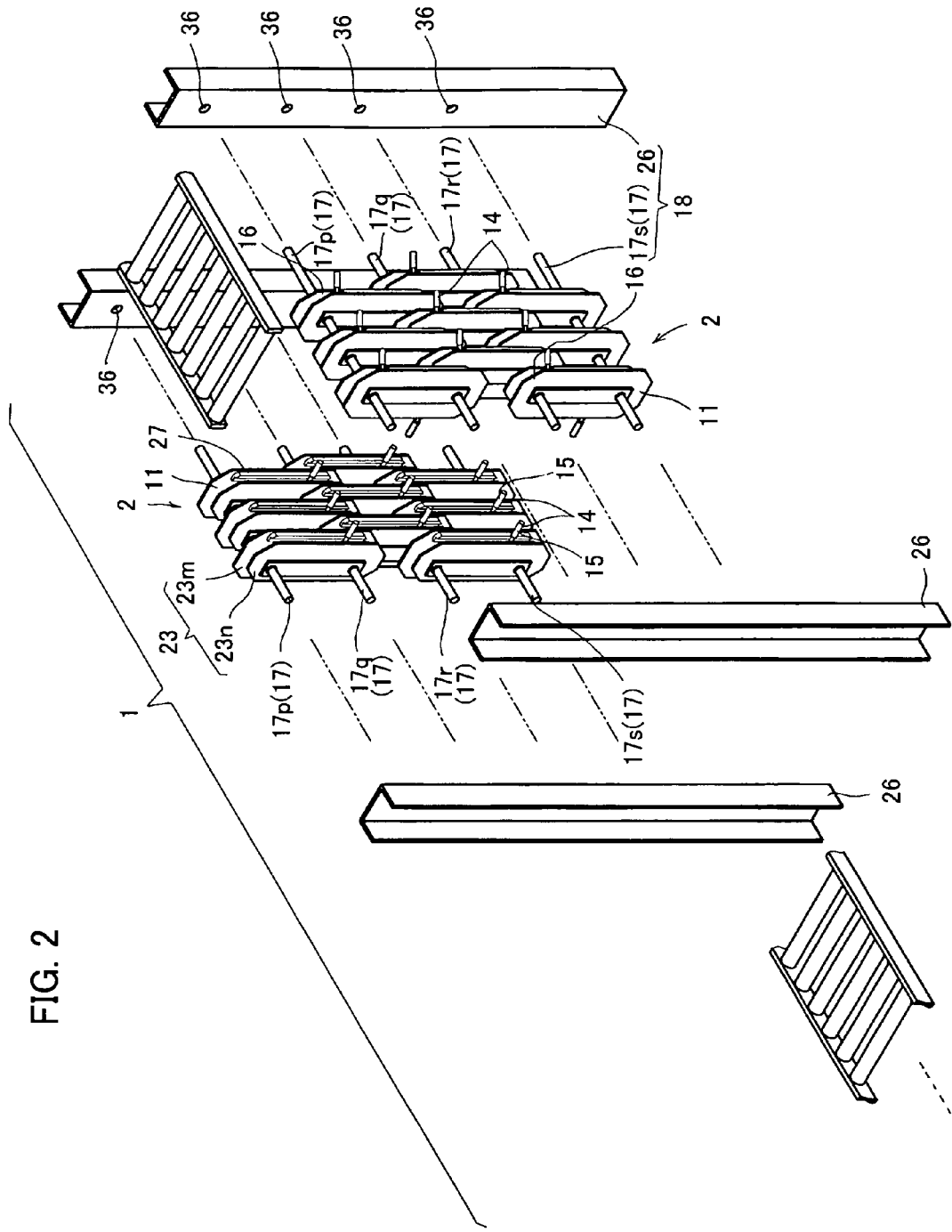
FIG. 2 is an exploded perspective view of the article lifting device relating to this embodiment on a conveyor line.

The lifting device 1 in this embodiment, as shown in FIG. 1, includes two conveyor units 2, each having the zones A to C, arranged to face to each other. The conveyor unit 2, as shown in FIG. 2, mainly consists of a plurality of basic unit conveyors 11 in each zone, which are attached to a supporting assembly 18. Specifically, in the lifting device 1, articles are lifted up and down on the vertical conveyor line configured with the two conveyor units 2.

Figure 4:
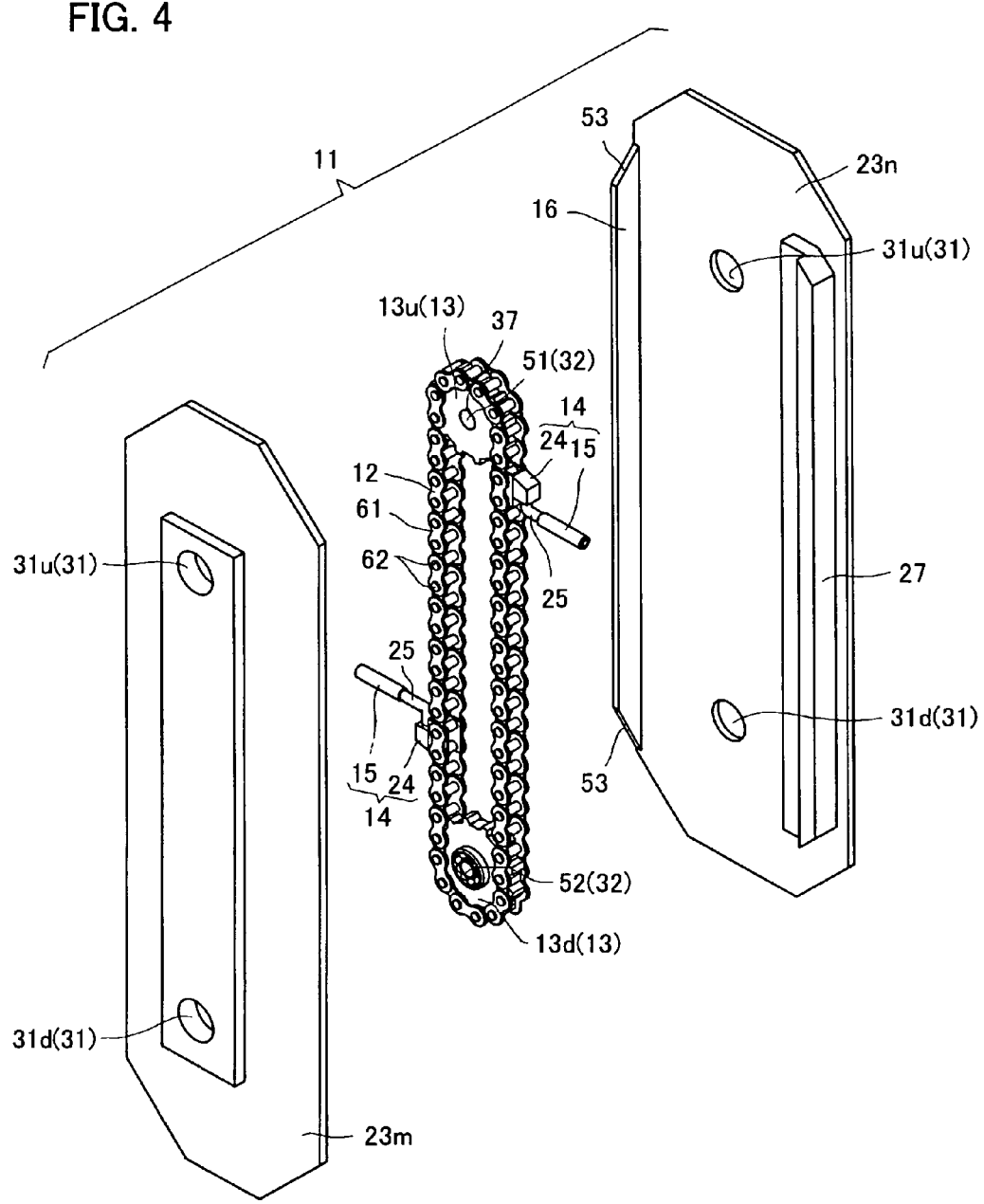
FIG. 4 is an exploded perspective view of a basic unit conveyor in FIG. 1.
Figure 11:
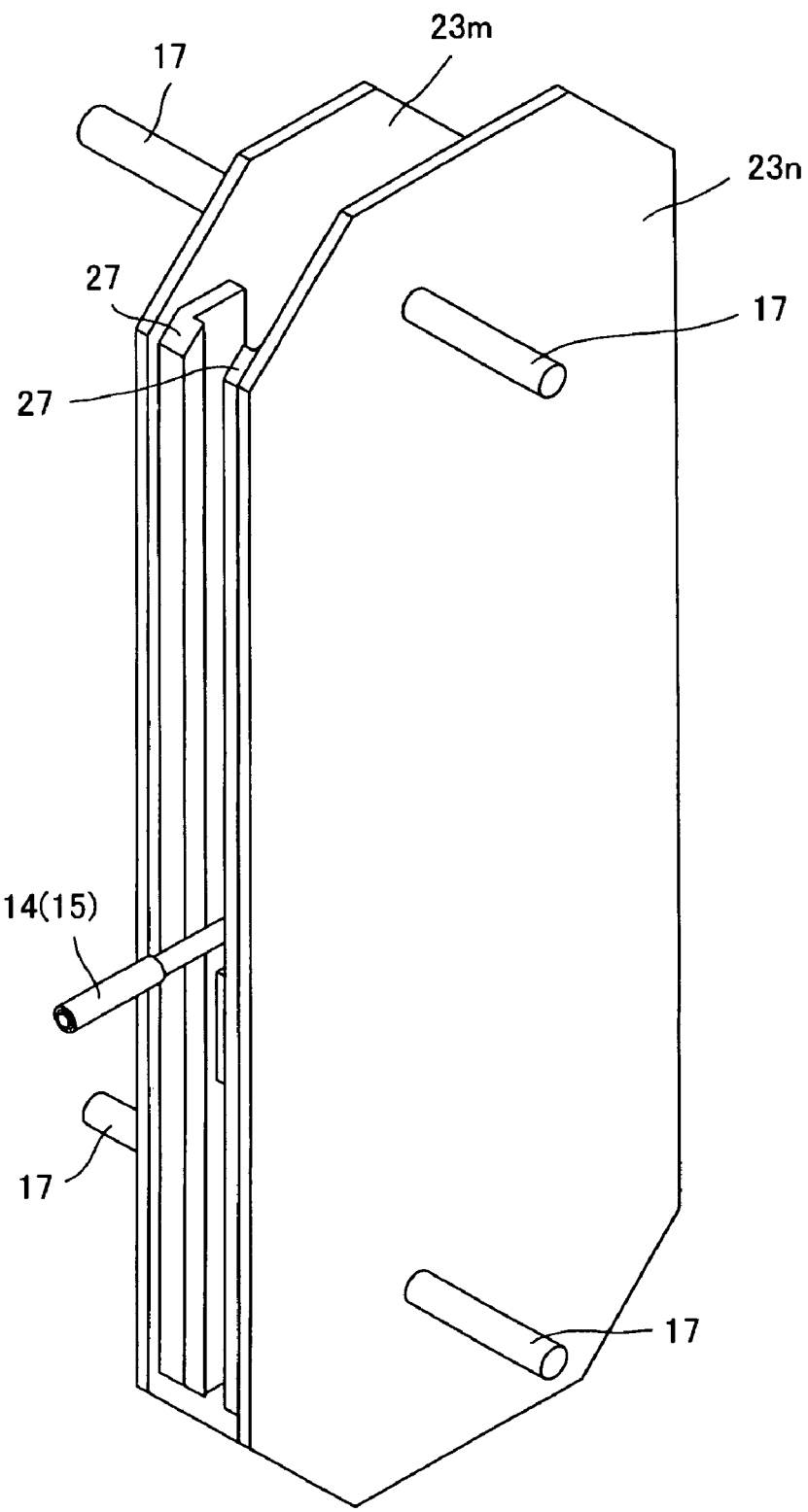
FIG. 11 is a perspective view of the basic unit conveyor in FIG. 1.
Figure 12:
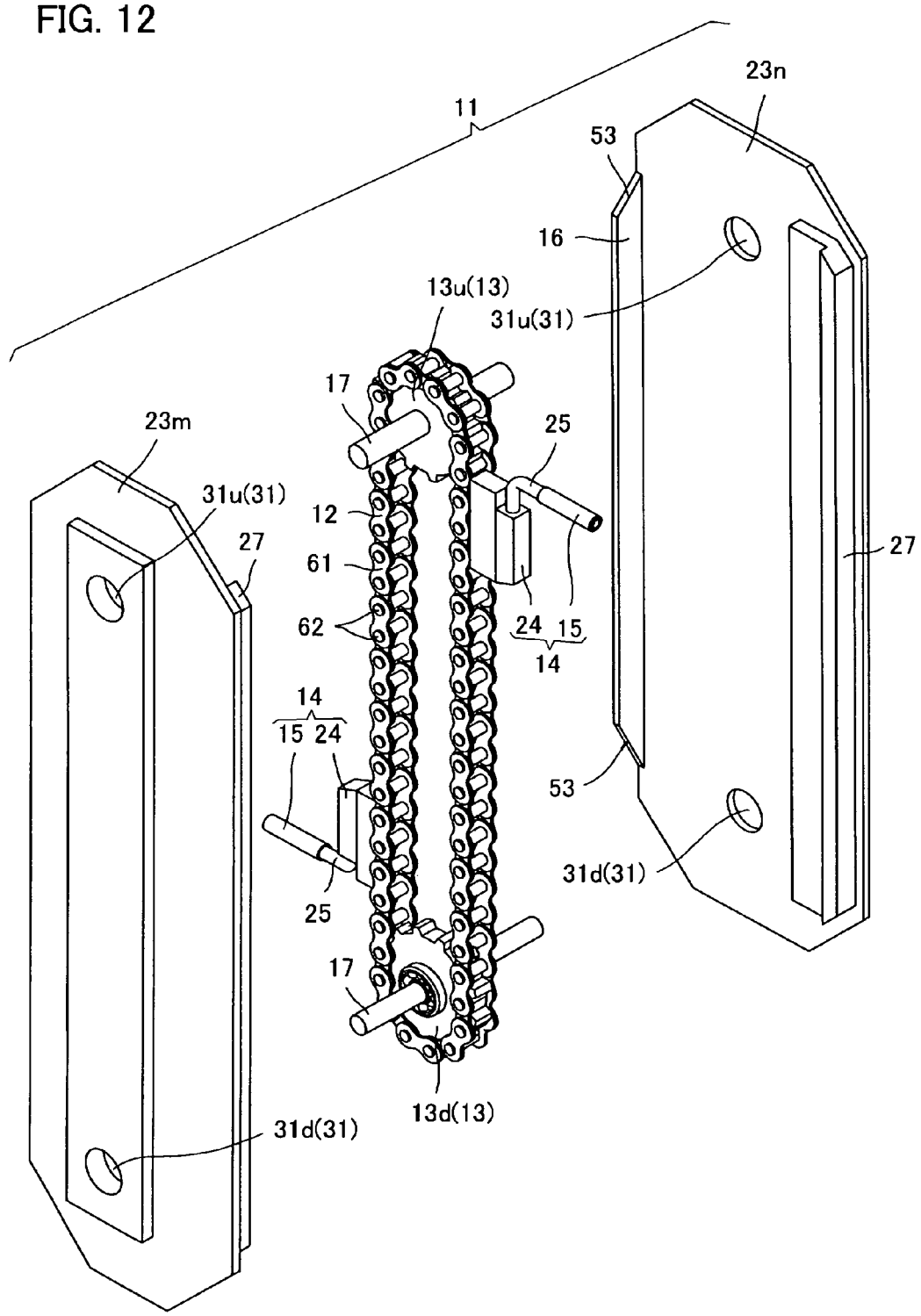
FIG. 12 is an exploded perspective of the basic unit conveyor in FIG. 1, different from that in FIG. 4.

The basic unit conveyor 11, as shown in FIGS. 4, 11, and 12, mainly consists of two vertically-long plate-like outer members 23 (23m and 23n), two rotary bodies 13 arranged as sandwiched between the outer members 23, an elongated carrier 12 looped annularly around the two rotary bodies 13, and two supporting bodies 14 secured to the carrier 12. The two supporting bodies 14 are normally situated at positions opposite to each other with respect to the center of the carrier 12.

The rotary body 13, as shown in FIGS. 4 and 12, is a gear (sprocket) for conducting rotation to a chain or the like, having a shaft hole 32 penetrating therethrough in a thickness direction in the center of the body 13. The two rotary bodies 13 in this embodiment have differently-structured shaft holes 32. Specifically, the shaft hole 32 of the rotary body 13 at an upper side is a keyed hole 51 provided with a keyway 37, whereas the other shaft hole 32 of the rotary body 13 at a lower side is a free rotation hole 52 provided with a bearing.

The carrier 12 is an elongated chain annularly looped around the two rotary bodies 13. This chain has the same structure as a known one, being structured by a plurality of units 61 fixed rotatively to each other via pins 62. The two supporting bodies 14 are secured to the chain used as the carrier 12 employed in this embodiment via the pins 62 and arranged at regular intervals.

The supporting body 14 is made up of a mounting part 15 on which an article is mounted, a fixed part 24 fixed to the carrier 12, and a supporting rod 25 of an L shape.

The mounting part 15 is of a hollow cylindrical shape with the supporting rod 25 inserted therein. The supporting rod 25 extends in a substantially vertical direction at one side (vertical part) of the L shape and in a substantially horizontal direction at another side (horizontal part). The horizontal part supports the mounting part 15, which is rotatable around the axis of the horizontal part.

The whole supporting rod 25 pivots around the vertical part. The shaft 25 shown in FIG. 15B takes an orientation or position for supporting an article, which position is referred to as a "conveying position." Whereas, the shaft 25 having pivoted by about 90 degrees takes another orientation or position with its horizontal part being substantially parallel to an axial direction of the rotary body 13 for avoiding protrusion of the supporting body 14 out of the device 1, which position is referred to as a "waiting position."

The supporting rod 25 has at a proximal end a recessed side face (not shown) with which a bearing is engaged.

The fixed part 24 is of a substantially box shape and provided with an opening having a bearing to which the supporting rod 25 is attached and two pin insertion holes (not shown) for fixing the part 24 to the carrier 12. Two of the pins 62 of the carrier 12 are inserted in the pin insertion holes. Specifically, the pins 62 where the fixed part 24 is to be positioned are removed once in assembly and then brought back with the fixed part 24, which is fixed to the carrier 12 via the pins 62. At this time, the fixed part 24 would not lie astride any two units 61.

In short, the supporting body 14 is configured by the supporting rod 25, the mounting part 15 rotatably arranged on a distal end of the rod 25, and the fixed part 24 to which a proximal end of the rod 25 is pivotally fixed via the opening having the bearing. The supporting body 14 is fixed to the carrier 12 via the pins 62 of the carrier 12 inserted in the pin insertion holes of the fixed part 24.

Each of the outer members 23m and 23n is a plate made from metal such as stainless steel. The outer members 23m and 23n are arranged to face to each other without the contact of each other. Each member 23m or 23n has two shaft insertion holes 31 positioned in such a manner that the respective holes 31 of the members 23m and 23n are communicated with each other. The shaft insertion holes 31 are positioned substantially in the center in a width direction of the outer member 23 and at some interval in a longitudinal direction thereof and penetrate therethrough in a thickness direction, in each of the holes 31 a rotary shaft 17 of the supporting assembly 18 (described below) being inserted.

As shown in FIGS. 4 and 11, the outer members 23m and 23n each further have a holding member 27 inside along an edge of one longitudinal side. The holding member 27 also functions as a guide (first guide) for changing the position of the supporting body 14 from the waiting position to the conveying position. The outer member 23n still further has a guide (second guide) 16 for changing the position of the supporting body 14 from the conveying position to the waiting position on another longitudinal edge at the other side thereof.

The holding member 27, made of a material such as resin, is of a substantially L shape in a plan view and for preventing the supporting body 14 from pivoting relative to the fixed part 24. The holding members 27 are provided at both the outer members 23m and 23n for making an outer space narrow by joining the outer members 23m and 23n. That prevents the supporting body 14 from pivoting relative to the fixed part 24, whereby the mounting part 15 runs along a straight track (straight front track) with maintaining its orientation extending substantially horizontally and perpendicularly to the axial direction of the rotary body 13.

The guide 16 is formed in such a manner that another longitudinal side of the outer member 23n, which is opposite to the holding member 27, is bent at a right angle and provided with slopes 53 at the vicinity of both longitudinal ends. The slopes 53 each are inclined at a predetermined length from the vicinity of the longitudinal end (outer side) toward a center of the longitudinal side (inner side). The guide 16 has a straight portion between the slopes 53 at the both ends. The mounting part 15 of the supporting body 14 changes its orientation relative to the carrier 12 at the slopes 53 with which the mounting part 15 is brought into contact, so as to run along a track (straight rear track) maintaining its orientation at the straight portion.

The supporting assembly 18, as shown in FIG. 2, mainly consists of two side frames 26 and four rotary shafts 17 so as to support the basic unit conveyors 11 by means of the side frames 26 with the rotary shafts 17 penetrating through the conveyors 11.

The side frames 26 each are made from a material such as C-shaped steel and have four shaft mounting holes 36 formed at regular intervals in a longitudinal direction thereof. Each rotary shaft 17 is inserted in the respective shaft mounting hole 36.

The rotary shafts 17 are each a straight rod, some of the shafts 17 each having a keyway (not shown) cut toward an inner diameter direction and extending in a longitudinal direction of the shaft 17. The keyway has the same cutout geometry as the keyway 37 of the rotary body 13. Each rotary shaft 17 penetrates through the shaft insertion holes 31 and the shaft holes 32 of a plurality of the basic unit conveyors 11.

For that, the rotary shafts 17 each have a length enough to allow at least one end thereof to extend through the shaft mounting hole(s) 36 when each shaft 17 penetrates through a plurality of the conveyors 11.

In this embodiment, as shown in FIG. 2, four rotary shafts 17 are used and a driving motor 54 is connected to each of the shafts 17 except one located at the bottom.

Engagement of a substantially rectangular key member (not shown) with an overlapped keyway, which is formed by positioning of the keyway 37 on the keyed hole 51 of the rotary body 13 with the keyway (not shown) on the rotary shaft 17, prevents relative rotation between the rotary body 13 and the rotary shaft 17. Therefore, the rotary body 13 and the rotary shaft 17 integrally rotate, thereby driving the carrier 12 in a rotational direction.

On the other hand, the other rotary body 13 having the free rotation hole 52 with the bearing rotates relative to the rotary shaft 17 penetrating through the free rotation hole 52. That is, the rotary body 13 having the free rotation hole 52 independently rotates regardless of a direction and a speed of rotation of the rotary shaft 17.

Next, a combination of members of the article lifting device 1 in this embodiment will be described in detail below.

Herein, for a comprehensible explanation, the above-mentioned rotary shafts 17 are referred to as rotary shafts 17p, 17q, 17r, and 17s respectively from the top of the conveyor unit 2, and the basic unit conveyors 11 are referred to as basic unit conveyors 11a, 11b, and 11c respectively for each zone. The shaft insertion holes 31 and the rotary bodies 13 of the respective basic unit conveyors 11a, 11b, and 11c are referred to as shaft insertion holes 31u and 31d and rotary bodies 13u (driving rotary body) and 13d (driven rotary body) from the top.

The lifting device 1 in this embodiment, as shown in FIGS. 1 to 3, connects horizontal conveyor lines of different heights. In the device 1, two conveyor units 2 are arranged with the respective straight front tracks of a plurality of the basic unit conveyors 11 of the units 2 placed opposite to each other, so as to convey articles between the tracks.

The conveyor units 2 each include nine basic unit conveyors 11 laid vertically and horizontally in a plane.

The conveyor unit 2 has three zones, each of which has three basic unit conveyors 11. The three zones are vertically piled up, and accordingly the nine basic unit conveyors 11 are arranged vertically and horizontally in a plane.

In each of the three basic unit conveyors 11 of each zone, the rotary body (driving rotary body) 13u is positioned at an upper side, whereas the rotary body (driven rotary body) 13d is positioned at a lower side. In the three zones, as shown in FIG. 3, the conveyors 11 are arranged in a staggered manner. The rotary bodies (driving rotary bodies) 13u and the rotary bodies (driven rotary bodies) 13d of vertically-adjacent conveyors 11 are located at the same level. The same one rotary shaft 17 penetrates through the rotary bodies (driving rotary bodies) 13$u$ and the rotary bodies (driven rotary bodies) 13$d$ located at the same level.

Specifically, in this embodiment, the basic unit conveyors 11, three in each zone, are supported by the rotary shafts 17$p$, 17$q$, 17$r$, and 17$s$ of the supporting assembly 18 in an axial direction of the shafts 17. In other words, the rotary shafts 17$p$, 17$q$, 17$r$, and 17$s$ penetrate through the holes (the shaft insertion holes 31 and the shaft holes 32) communicated with one another of each conveyor 11 and are held by the side frames 26. Herein, the one ends of the rotary shafts 17$p$, 17$q$, and 17$r$ are respectively connected to driving motors 54.

More specifically, in the zone A, as shown in FIG. 3, the rotary shaft 17$s$ penetrates through the shaft insertion holes 31$d$ located at the lower sides of the basic unit conveyors 11$a$, whereas the rotary shaft 17$r$ penetrates through the shaft insertion holes 31$u$ located at the upper side thereof. The conveyors 11$a$ each are arranged at regular intervals in an axial direction. In the zone B, the basic unit conveyors 11$b$ are respectively arranged to be sandwiched between each two conveyors 11$a$ of the zone A and the rotary shaft 17$r$ penetrates through the shaft insertion holes 31$d$ of the conveyors 11$b$. That is, the rotary shaft 17$r$ penetrates through the conveyors 11$a$ and 11$b$ alternately in an axial direction. In other words, the conveyors 11$b$ each are also arranged at regular intervals (about a thickness of each conveyor 11$a$) in an axial direction. Further, the rotary shaft 17$q$ penetrates through the shaft insertion holes 31$u$ of the conveyors 11$b$, and as well as the rotary shaft 17$r$, the rotary shaft 17$q$ penetrates through the conveyors 11$b$ and 11$c$ of the zones B and C alternately in an axial direction. That is, the conveyors 11$c$ each are also arranged at regular intervals (about a thickness of each conveyor 11$b$) in an axial direction. And the rotary shaft 17$p$ penetrates through the shaft insertion holes 31$u$ of the basic unit conveyors 11$c$.

The vertically-adjacent basic unit conveyors 11 partly overlap in a vertical direction. Therefore, the carriers 12 within the above-mentioned conveyors 11 partly overlap with the vertically-adjacent carriers 12.

Consequently, this embodiment configures a substantially continuous conveyor line by using a plurality of the basic unit conveyors 11 arranged on a vertical conveyor line and by uniting a plurality of control zones.

By the lifting device 1 in this embodiment, vertical arrangement of a plurality of the basic unit conveyors 11 configures a continuous conveyor line and enables to convey articles continuously in a vertical direction. That prevents decrease in speed to convey articles on the vertical conveyor line, thereby ensuring conveyance of a number of articles in a short period of time. Further, that enables to convey a plurality of articles, especially those having different sizes and/or shapes to a required height in response to conditions, thereby ensuring efficient conveyance in a short period of time.

Now, operations of the supporting body 14 in the article lifting device 1 having the above-mentioned configuration will be described in detail, making reference to the accompanying drawings.

(Operations of the Basic Unit Conveyor 11)

Figure 13:
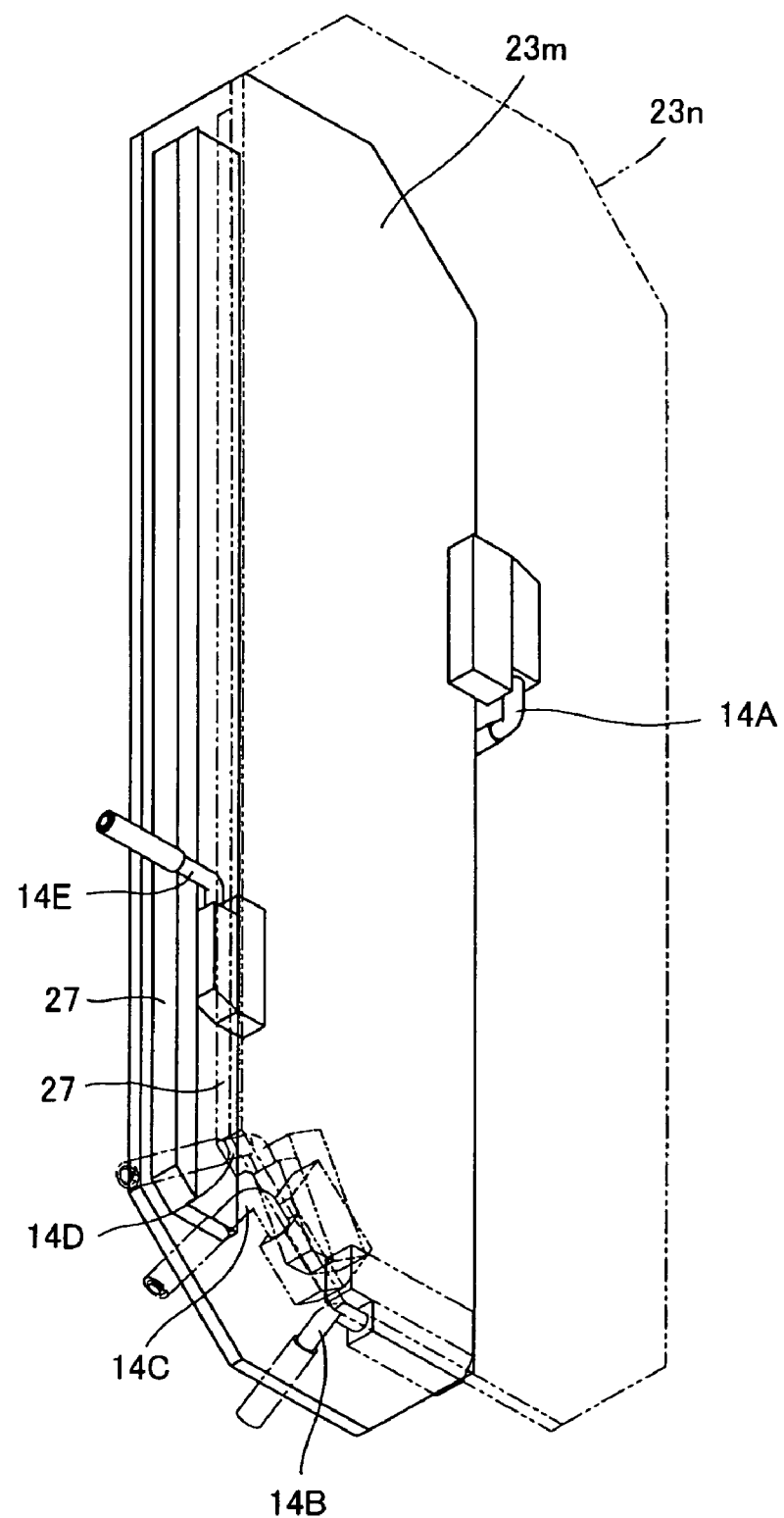
FIG. 13 is a view schematically showing a supporting body 14 being changed from a waiting position to a conveying position.

As to the basic unit conveyor 11, a detailed description will be given below. FIG. 13 schematically shows the supporting body 14 being changed from the waiting position to the conveying position. In FIG. 13, the numerals 14A to 14E each show a position and an orientation of the same supporting body 14 in order of time. The supporting body 14 is moved clockwise in this figure. At the level of 14A, the supporting body 14 is on the straight rear track, taking the waiting position. When entering the straight front track, the supporting body 14 is brought into contact with the guide, gradually changing its position to the conveying position at the levels of 14B to 14D. Then, the supporting body 14 is held by the two holding members 27, one of which is shown by a two-dot chain line. At the level of 14E, the supporting body 14 is on the straight front track, taking the conveying position.

Figure 14:
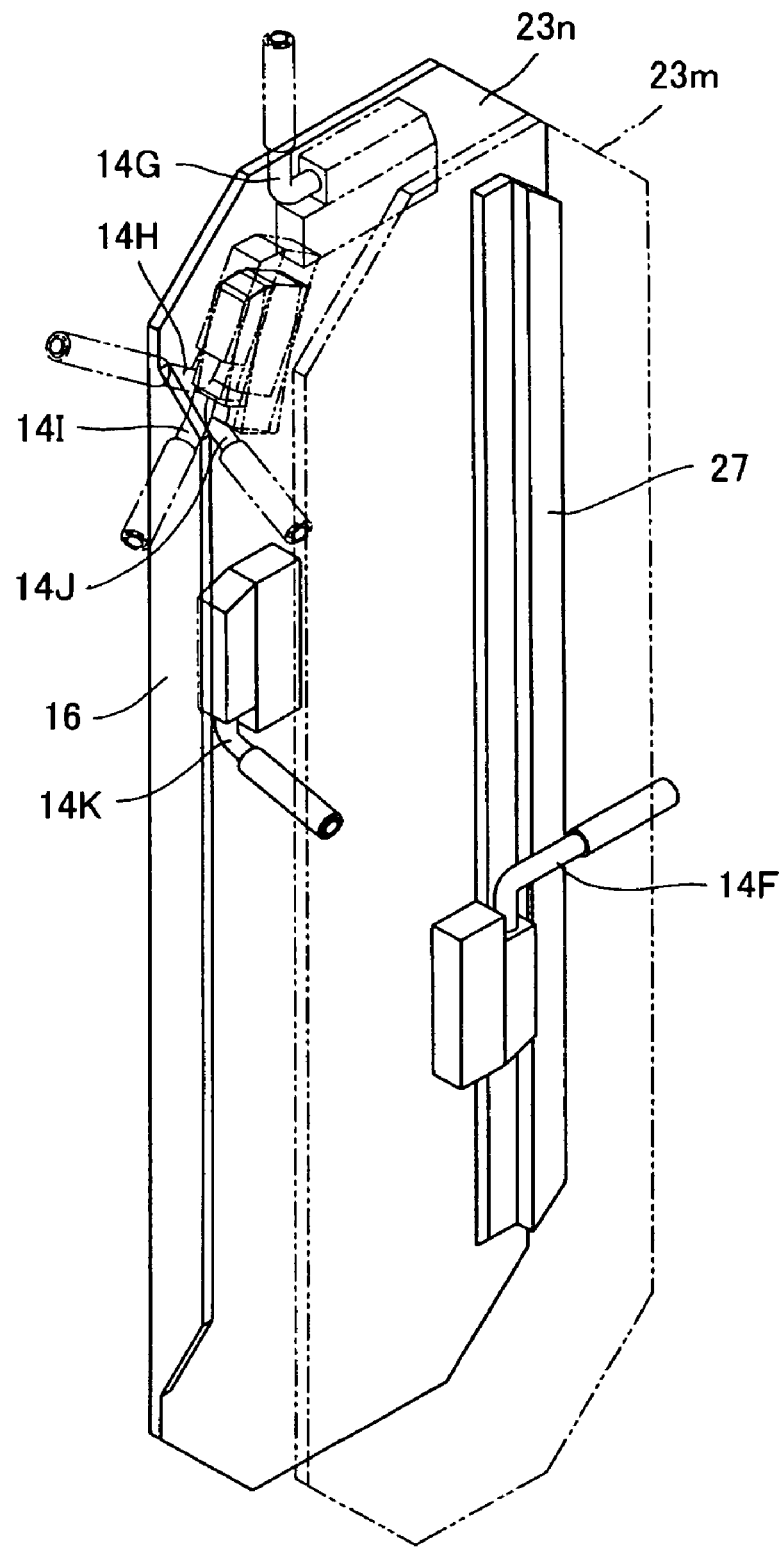
FIG. 14 is a view schematically showing the supporting body 14 being changed from the conveying position to the waiting position.

FIG. 14 schematically shows the supporting body 14 being changed from the conveying position to the waiting position. In FIG. 14, the numerals 14F to 14K each show a position and an orientation of the same supporting body 14 in order of time. FIG. 14 is a view seen from a direction opposite to that in FIG. 13, and hence the supporting body 14 is moved anticlockwise in this figure. The level of 14F is substantially the same level as that of 14E in FIG. 13. At the level of 14F, the supporting body 14 is on the straight front track, taking the conveying position. At the level of 14G, the supporting body 14 still takes the conveying position. When entering the straight rear track, the supporting body 14 is brought into contact with the guide 16, gradually changing its position to the waiting position at the levels of 14H to 14J. At the level of 14K, the supporting body 14 is on the straight rear track, taking the waiting position. The level of 14K is substantially the same level as that of 14A in FIG. 13. The supporting body 14 repeats the operations shown in FIGS. 13 and 14. Herein, the guide for changing the orientation of the supporting body 14 from the conveying position to the waiting position or vice versa is not necessarily of the shape shown in the figures, and may be determined appropriately so as to change the orientation of the supporting body 14 when the body 14 is brought into contact with the guide at an appropriate location.

Figure 15A:
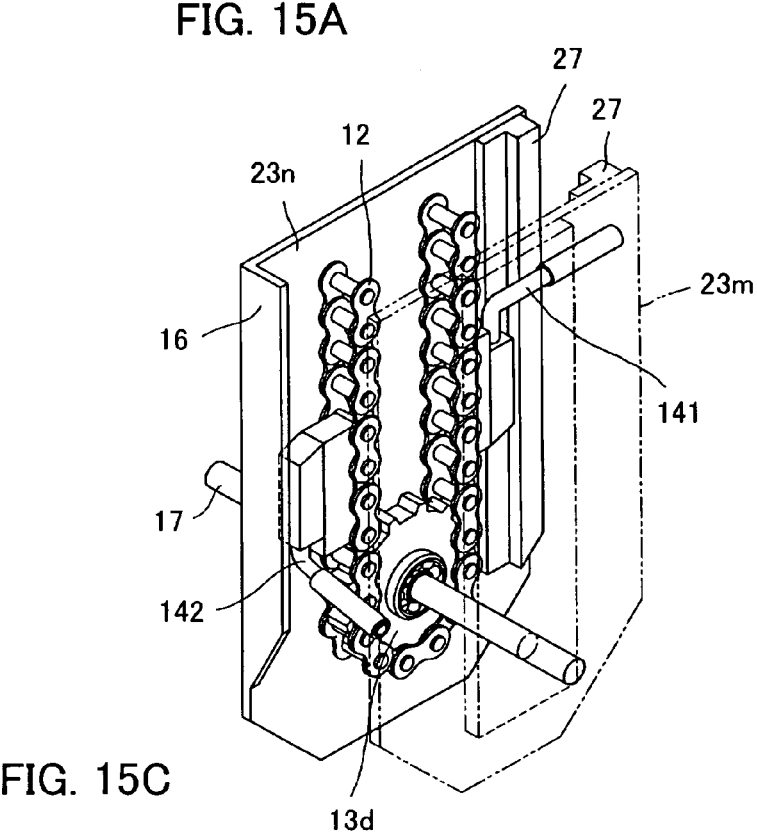
FIGS. 15A to 15C are views explaining a position or orientation of the supporting body 14 in a simplified representation.
Figure 15B:
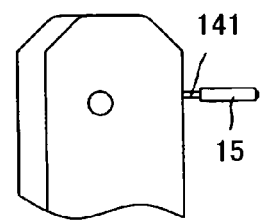
Figure 15C:
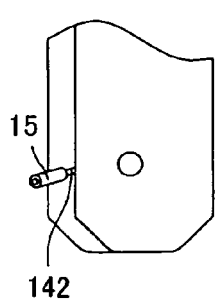
Figure 16:
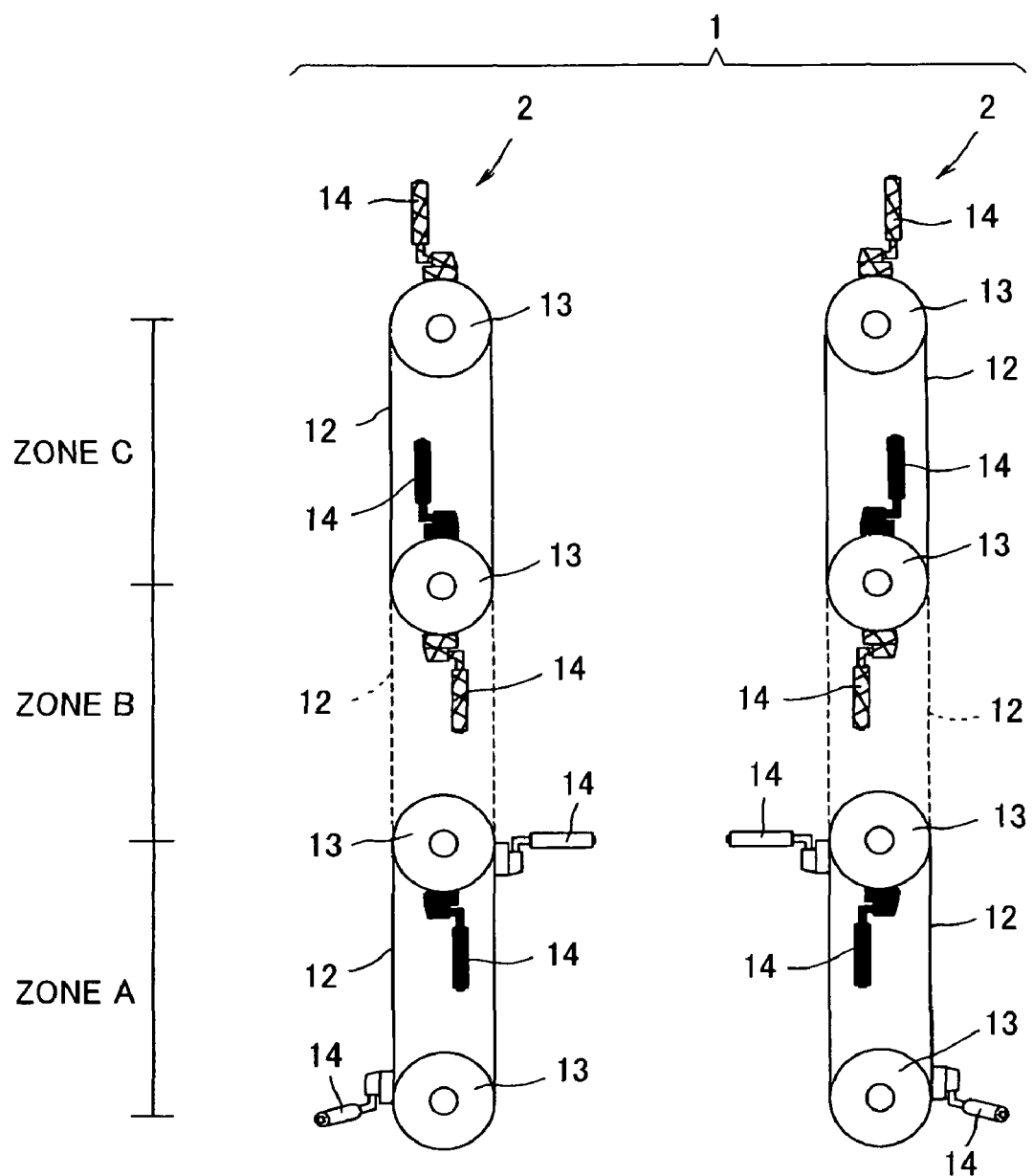
FIG. 16 is an explanatory diagram showing the lifting device that is an embodiment of the present invention in a simplified representation.

FIGS. 15A to 15C are views explaining the orientation of the supporting body 14 in a simplified representation. FIG. 15A shows a supporting body 141 taking the conveying position and a supporting body 142 taking the waiting position. The supporting body 141 taking the conveying position is schematically shown as in FIG. 15B in such a manner that the horizontal part (mounting part 15) extends horizontally. The supporting body 142 taking the waiting position is schematically shown as in FIG. 15C in such a manner that the horizontal part (mounting part 15) extends obliquely. FIG. 16 is an explanatory diagram showing the lifting device 1 of the present invention in such a simplified representation. Articles are conveyed through space between the two conveyor units 2. For facilitating visualization, the carriers 12 in the zone B are shown by a dashed line, the supporting bodies 14 in the zone B are shown in black, and the supporting bodies 14 in the zone C are shown by cross-hatching. In this figure, among the supporting bodies 14 in the zone A, those on the straight rear track take the waiting position, whereas those on the straight front track take the conveying position, for example. FIGS. 5A to 9F are views shown by a further simplified representation of FIG. 16. Herein, arrows used in FIGS. 5A to 9F designate respective operations: a heavy line showing operations in the zone A, a medium line showing operations in the zone B, and a thin line showing operations in the zone C.

(Upward Conveyance in a Vertical Direction)

As shown in FIG. 5A, waiting locations of one of the supporting bodies 14 (hereinafter referred to as a first supporting body 14) immediately after starting of the lifting device 1 are situated at the most bottom of the straight front track in the zone A, at the lower boundary between the straight front track and the straight rear track in the zone B, and at the lower boundary between the straight front track and the straight rear track in the zone C as well as in the zone B. At that time, the other of the supporting bodies 14 (hereinafter referred to as a second supporting body 14) is normally situated at a position opposite to the above-mentioned first supporting body 14 with respect to the center of the annular carrier 12.

First, as shown in FIG. 5A, a first article 10 is introduced into the zone A of the device 1 from a zone X in a conveyor for horizontal conveyance shown in FIG. 3.

Herein, in this embodiment, each supporting body 14 has the mounting part 15 with which an article is brought into contact, the mounting part 15 being of a hollow cylindrical shape and being rotatable around the supporting rod 25 inserted therein.

Thus, the article 10 having pushed out of the zone X is placed on a pair of the mounting parts 15, which rotates by a pushing force of the zone X, so as to be moved straight. Then, the article 10 is completely moved into the zone A.

Thereafter, when the article 10 is detected by a load presence sensor (not shown) provided at a predetermined location, the shaft 17$r$ is driven so as to drive the rotary bodies 13$u$ at the upper side of the basic unit conveyors 11 in the zone A, thereby driving the carriers 12 in the zone A. In the zone A, the article 10 on the first supporting bodies 14 is conveyed upwardly in a vertical direction as shown in FIG. 5B. When the next load presence sensor (not shown) provided at a predetermined location detects the article 10, the shaft 17$q$ is driven so as to drive the rotary bodies 13$u$ at the upper side and the carriers 12 of the basic unit conveyors 11 in the zone B. Then, each horizontal part of the first supporting bodies 14 in the zone B is brought into contact with the bottom of the holding member 27 (functioning as the guide), so as to pivot. That moves the first supporting bodies 14 in the zone B from the waiting position to the conveying position (straight front track) as shown in FIG. 5C. At this time, the first supporting bodies 14 of both the conveyors 11$a$ and 11$b$ reach the same level at substantially the same speed and at substantially the same time, thereby ensuring smooth continuous conveyance of the article 10 without decrease in speed in a shift of the zones.

Then, as shown in FIG. 6D, the article 10 is conveyed further upwardly in a vertical direction.

Meanwhile, in the lower zone A, the other supporting bodies 14 (hereinafter referred to as the second supporting bodies 14) in the zone A reach a predetermined location on the straight front track, then returning to the waiting position (FIG. 6E). At this time, the first supporting bodies 14 in the zone A are moved from the straight front track to the straight rear track, where the guide 16 changes an extending orientation or position of the mounting parts 15. Hereinafter, when the supporting bodies 14 are moved from the straight front track to the straight rear track, the guides 16 change the orientations of the mounting parts 15 also in other zones.

In this embodiment, each zone is driven only by the rotary shaft 17 located at the upper side of the basic unit conveyors 14, and hence independently driven.

More specifically, when the first supporting bodies 14 in the zone B are moved from the waiting location to the straight front track as shown in FIG. 5C and further moved so as to convey the article 10 upwardly in a vertical direction as shown in FIG. 6D, the rotary shaft 17$q$ between the zones B and C rotates. That rotates the driving rotary bodies 13$u$ in the zone B, thereby driving the carriers 12 in the zone B. At this time, in the upper zone C, though being engaged with the rotary shaft 17$q$, the driven rotary bodies 13$d$ are rotatable freely from the shaft 17$q$, so as not to drive the carriers 12 in the zone C.

The same can be said to the lower zone A, though rotation of the carriers 12 in the zone B rotates the driven rotary bodies 13$d$ in the zone B, lo the bodies 13$d$ in the zone B are rotatable freely from the shaft 17$r$, so as not to rotate the rotary shaft 17$r$ between the zones A and B. Thus, the carriers 12 in the zone A are not driven.

In short, rotation of the rotary shaft 17$r$ between the zones A and B makes no influence on the zone B. Therefore, it is possible to rotate the rotary shaft 17$r$ independently of a driving situation of the zone B. Further, since the supporting bodies 14 in the zone A are already separated from the article 10, nothing prevents the supporting bodies 14 from being moved.

In this embodiment, upon separation of the article 10 from the supporting bodies 14 in the zone A, the supporting bodies 14 return to the waiting position by rotation of the rotary shaft 17$r$.

Then, as shown in FIG. 6E, a second article 10' is introduced into the zone A from the zone X.

Returning to the description of the first article 10 having been introduced into the device 1, when being conveyed further upwardly in a vertical direction (FIG. 6E), the first article 10 is separated from the supporting bodies 14 in the zone B.

Meanwhile, in the zone C, when the first article 10 is detected by a load presence sensor (not shown) provided at a predetermined location as well as above description, the first supporting bodies 14 in the zone C are moved from the waiting location to the straight front track as shown in FIG. 6E. That means the supporting bodies 14 of both the conveyors 11$b$ and 11$c$ reach the same level at substantially the same time.

Then, as shown in FIG. 6F, when the first article 10 reaches substantially the same level as that (level of a zone Y) of another conveyor for horizontal conveyance located above in a vertical direction, the first article 10 is carried out to the zone Y of the conveyor as shown in FIG. 7G. At this time, the first article 10 is detected by a load presence sensor (not shown), so as to be pushed out in a horizontal direction by a pusher 55 shown in FIG. 3. Then, in the zone B, the second supporting bodies 14 reach a predetermined location, returning to the waiting position again. Another article 10' having been introduced after the first article 10 follows the same process as the first article 10 so as to be conveyed upwardly. Articles are introduced one after another into each pair of the supporting bodies 14 at the waiting location and conveyed upwardly in a vertical direction. In this way, articles are conveyed in sequence in the upward conveyance in a vertical direction.

In the case that a load presence sensor (not shown) at a predetermined location in the zone X of the conveyor shown in FIG. 3 detects an article and that the supporting bodies 14 in the zone A fail to wait at a predetermined location, the zone X and some other zones are stopped by zone control. An article is temporarily kept in the zone X with certainty. That prevents deviation of an article from the conveyor line, which is caused by lack of the supporting bodies 14 waiting at the predetermined location in the zone A.

(Downward Conveyance in a Vertical Direction)

As shown in FIG. 8A, waiting locations of the first supporting bodies 14 immediately after starting of the lifting device 1 are all situated at the most top of the straight front track in the zones A, B, and C. Whereas, the second supporting bodies 14 each are normally situated at a location opposite to the respective first supporting body 14 mentioned above with respect to the center of the annular carrier 12.

First, as shown in FIG. 8A, a first article 10 is introduced into the zone C of the device 1 from the zone Y in the conveyor for horizontal conveyance shown in FIG. 3. The article 10 having been placed on the first supporting bodies 14 in the zone C, as shown in FIG. 8B, is conveyed downwardly in a vertical direction. When the load presence sensor (not shown) provided at the predetermined location detects the article 10 and the first supporting bodies 14 in the zone C reach the same level as that of the waiting location of the first supporting bodies 14 in the zone B, the latter is moved downwardly in a vertical direction. At this time, the first supporting bodies 14 of both the conveyors 11c and 11b are moved downwardly in a vertical direction at substantially the same speed and at substantially the same time, thereby ensuring smooth continuous conveyance of the article 10 without decrease in speed in a shift of the zones.

Then, in the zone B, when the first article 10 is detected by the load presence sensor (not shown) provided at the predetermined location and the first supporting bodies 14 in the zone B reach the waiting location of the first supporting bodies 14 in the zone A as shown in FIG. 8C, the first supporting bodies 14 in the zone A are moved downwardly in a vertical direction as shown in FIG. 9D, so as to be receptible of a second article 10'. Meanwhile, the second supporting bodies 14 of the conveyors 11c and 11b reach the predetermined location, returning to the waiting position again. Herein, as well as the case of the upward conveyance, when being moved from the straight front track to the straight rear track, the first supporting bodies 14 are forced to change their orientations by the guide 16.

Then, as shown in FIG. 9E, when the first article 10 reaches substantially the same level as that (level of the zone X) of the other conveyor for horizontal conveyance located below in a vertical direction, the article 10 is carried out to the zone X of the conveyor as shown in FIG. 9F. At this time, the first article 10 is detected by the load presence sensor (not shown), so as to be pushed out in a horizontal direction by the pusher 55 shown in FIG. 3. Then, the second supporting bodies 14 in the zone A reach the predetermined location, returning to the waiting position again. Articles are introduced one after another into each pair of the supporting bodies 14 at the waiting location and conveyed downwardly in a vertical direction, as well as the case of the upward conveyance.

In the case that the load presence sensor (not shown) at the predetermined location in the zone Y of the conveyor shown in FIG. 3 detects an article and that the supporting bodies 14 in the zone C fail to wait at the predetermined location, the zone Y and some other zones are stopped by zone control. An article is temporarily kept in the zone Y with certainty. That prevents deviation of an article from the conveyor line, which is caused by lack of the supporting bodies 14 waiting at the predetermined location in the zone C.

As shown in FIGS. 8C to 9F, articles are also conveyed in sequence in the downward conveyance in a vertical direction.

As described above, since the article lifting device 1 in the present embodiment is constituted by a plurality of the basic unit conveyors 11 arranged vertically and horizontally, it is possible to easily and discretely adjust its height and width. Further, division into a plurality of zones in a conveying direction (vertical direction) allows independent control of each zone. Combining with zone control of a plurality of the conveyors for horizontal conveyance of different heights, the article lifting device 1 prevents such a problem in which articles are deviated from the conveyor line when the articles are carried in and out between the conveyors and the article lifting device 1.

Further, since each carrier 12 partly overlaps with the other vertically-adjacent carriers 12, articles are smoothly conveyed with no decrease in conveying speed at the boundaries of the zones in vertical conveyance. Consequently, the article lifting device 1 in the present embodiment efficiently conveys a number of articles in a short period of time.

The device 1 in the above-mentioned embodiment includes a plurality of the basic unit conveyers 11 in a vertical direction so as to easily adjust the height. Further, arrangement of the carriers 12 of the vertically-adjacent basic unit conveyors 11 to overlap one another in a vertical direction configures a continuous conveying line. That allows smooth conveyance at the boundaries of the vertically-adjacent basic unit conveyors 11. Further, control of the horizontal conveyor line in division into a plurality of zones prevents decrease in conveying speed at the boundaries of the zones, thereby ensuring efficient conveyance. Still further, the zone control prevents such a problem in which articles are deviated from the conveyor line or in which adjacent articles in a conveying direction bump against each other.

Figure 10:
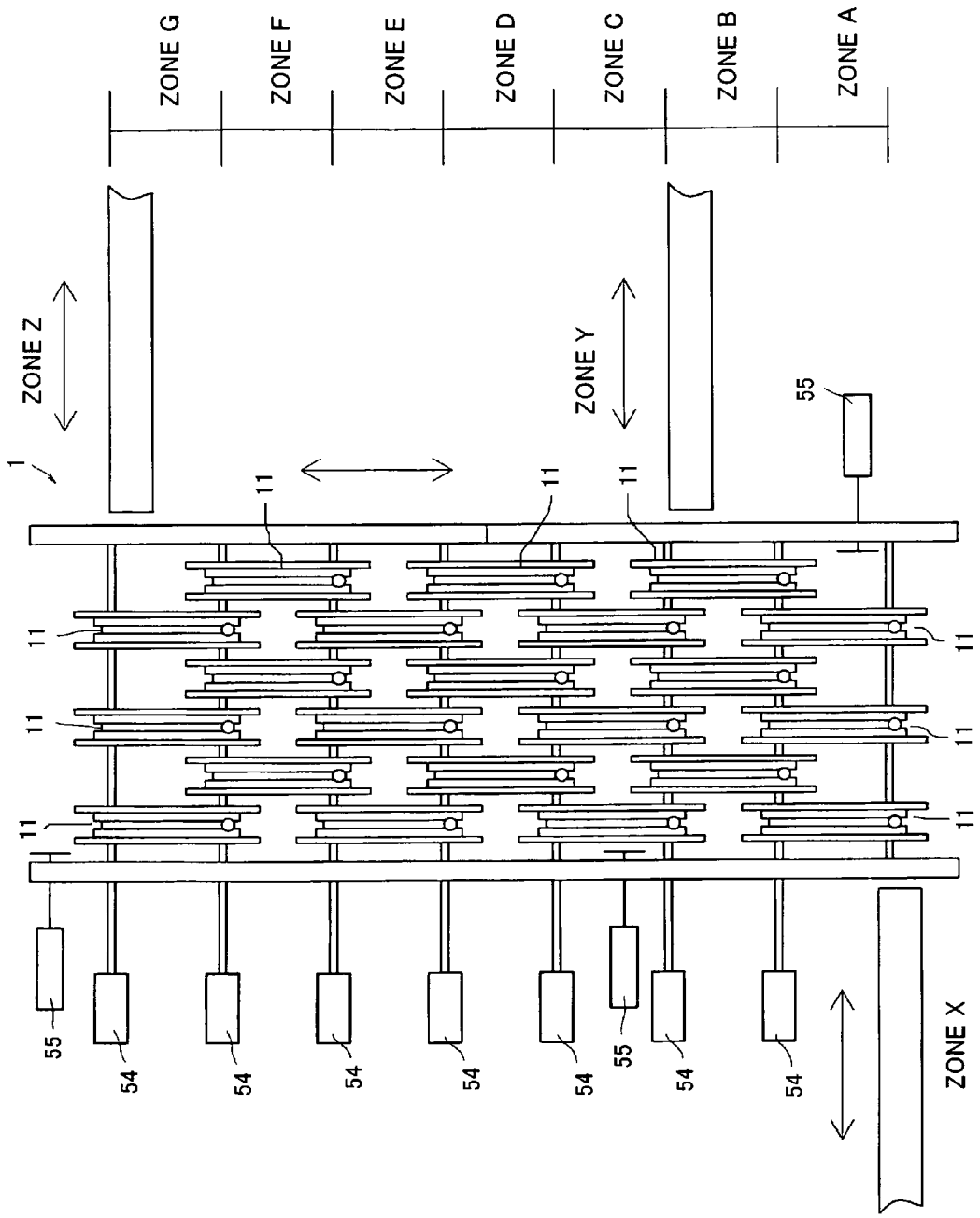
FIG. 10 is a schematic diagram of an article lifting device relating to a modified embodiment of the present invention.

The lifting device 1 is constituted by three zones with one carry-in entrance and one carry-out exit in the above-mentioned embodiment, but the present invention is not limited thereto, and as shown in FIG. 10, may be constituted by more than three zones with a plurality of carry-in entrances and carry-out exits. In this case, for example, such control that an article is introduced from the zone X and carried out to the zone Y or Z or from the zone Z to the zone Y or X may be done. In this way, the present invention enables conveyance of a plurality of articles to a plurality of various heights.

The article lifting device 1 is constituted by three basic unit conveyers 11 in a horizontal direction in the present embodiment, but the present invention is not limited thereto, and for example, may be constituted by two or more than three basic unit conveyers 11. In short, it is enough to support articles so as to be conveyed.

The invention claimed is:

1. An article lifting device for lifting up and down articles, comprising a plurality of basic unit conveyors,
   the conveyors each having an upper rotary body, a lower rotary body arranged below the upper rotary body, and an elongated carrier looped around the upper and lower rotary bodies, the rotary bodies being for driving the carrier,
   the carrier being provided with at least one supporting body for supporting an article,
   wherein the basic unit conveyors are arranged in vertically and horizontally spaced relationship to each other in a plane, so that at least first and second vertically-adjacent basic unit conveyors overlap in a vertical direction and cooperate so as to allow transfer of an article supported by and moved upwardly by the one supporting body on the first basic unit conveyor to the one supporting body on the second basic unit conveyor for movement further upwardly by the one supporting body on the second basic unit conveyor.

2. The article lifting device as defined in claim 1,
   further comprising a plurality of substantially horizontally-placed shafts arranged in a vertical direction,
   wherein the basic unit conveyors are arranged vertically and horizontally in a plurality of columns and rows with a plurality of the basic unit conveyors in each of the columns and rows,
   wherein the upper rotary bodies of the conveyors belonging to one row and the lower rotary bodies of the conveyors belonging to a next superior row are penetrated by one shaft among the shafts,
   the rotary bodies belonging to one row among the rotary bodies penetrated by one shaft being rotatable integrally with the shaft, and
   the rotary bodies belonging to the other row being rotatable freely from the shaft.

3. The article lifting device as defined in claim 2,
the shafts including at least one shaft connected to a driving source.

4. The article lifting device as defined in claim 3,
the driving source being connected to a plurality of shafts so as to selectively drive and stop each of the shafts.

5. The article lifting device as defined in claim 1,
wherein the basic unit conveyors arranged vertically and horizontally in a plane constitute a unit,
at least first and second pairs of the units being arranged opposite each other.

6. The article lifting device as defined in claim 1,
the supporting body being pivotable between a conveying position for supporting an article and a waiting position for preventing the supporting body from protruding out of the device.

7. The article lifting device as defined in claim 6,
the carrier being looped annularly around the upper and lower rotary bodies and driven round the rotary bodies in a circle on a substantially straight front track and a substantially straight rear track, the front track being situated nearer an article than the rear track, and
wherein the device is designed to change an orientation of the supporting body to take the conveying position when the body enters the front track and to change that of the supporting body to take the waiting position when the body enters the rear track.

8. The article lifting device as defined in claim 6,
wherein the conveyors each comprise a first guide and a second guide,
the first guide changing an orientation of the supporting body to take the conveying position when the body enters the front track, and
the second guide changing an orientation of the supporting body to take the waiting position when the body enters the rear track.

9. The article lifting device as defined in claim 6,
the supporting body being of a substantially L shape and having a horizontal part extending in a substantially horizontal direction and a vertical part extending in a substantially vertical direction,
the supporting body being supported by the carrier pivotally around an axis of the vertical part,
so that pivoting of the supporting body alternates the conveying position and the waiting position.

10. The article lifting device as defined in claim 1,
the supporting body having a hollow cylindrical rotatable member and a supporting shaft inserted in the rotatable member,
the rotatable member being designed to support an article by being brought into contact with the article, and
the supporting shaft being designed to support the member rotatably around the supporting shaft.

11. The article lifting device as defined in claim 10,
the supporting shaft extending in a substantially horizontal direction.

12. The article lifting device as defined in claim 1,
wherein the basic unit conveyors each comprise a pair of outer members arranged to face to each other, two rotary bodies arranged as sandwiched between the outer members, an elongated carrier looped annularly around the rotary bodies, and a plurality of supporting bodies secured to the carrier,
the carrier being driven round the rotary bodies in a circle on a substantially straight front track and a substantially straight rear track, and
the outer members having a first guide for changing an orientation of each supporting body to take a conveying position for supporting an article when the supporting body enters the front track and a second guide for changing an orientation of each supporting body to take a waiting position for preventing the supporting body from protruding out of the device when the supporting body enters the rear track.

13. The article lifting device as defined in claim 12,
wherein the outer members each is in the form of a plate.

* * * * *